(12) United States Patent
Tanio et al.

(10) Patent No.: US 9,727,004 B2
(45) Date of Patent: Aug. 8, 2017

(54) TONER SUPPLY ROLLER AND IMAGE FORMING APPARATUS

(71) Applicant: SUMITOMO RUBBER INDUSTRIES, LTD., Kobe-shi, Hyogo (JP)

(72) Inventors: Yusuke Tanio, Kobe (JP); Naoyuki Satoyoshi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 14/659,112

(22) Filed: Mar. 16, 2015

(65) Prior Publication Data

US 2015/0277276 A1 Oct. 1, 2015

(30) Foreign Application Priority Data

Mar. 31, 2014 (JP) ................. 2014-073641

(51) Int. Cl.
| | |
|---|---|
| *B29C 47/00* | (2006.01) |
| *G03G 15/08* | (2006.01) |
| *B29C 44/20* | (2006.01) |
| *B29K 9/06* | (2006.01) |
| *B29K 23/00* | (2006.01) |
| *B29K 105/00* | (2006.01) |
| *B29K 105/24* | (2006.01) |
| *B29K 507/04* | (2006.01) |

(Continued)

(52) U.S. Cl.
CPC ......... *G03G 15/0808* (2013.01); *B29C 44/20* (2013.01); *B29C 47/0023* (2013.01); *B29C 2035/0855* (2013.01); *B29K 2009/06* (2013.01); *B29K 2011/00* (2013.01); *B29K 2023/16* (2013.01); *B29K 2105/0005* (2013.01); *B29K 2105/24* (2013.01); *B29K 2507/04* (2013.01); *B29K 2995/0005* (2013.01); *B29L 2031/767* (2013.01)

(58) Field of Classification Search
CPC .............. B29C 47/0023; B29C 47/003; B29K 2023/16; B29K 2105/0005; B29K 2507/04; B29L 2031/767; G03G 15/0808
USPC ....................................................... 399/279
See application file for complete search history.

(56) References Cited

U.S. PATENT DOCUMENTS

| | | | | |
|---|---|---|---|---|
| 2002/0091170 | A1* | 7/2002 | Sakata | ................... C08J 9/0061 521/86 |
| 2013/0203573 | A1* | 8/2013 | Satoyoshi | .............. H01B 1/125 492/59 |
| 2014/0287900 | A1* | 9/2014 | Tanio | ....................... H01B 1/24 492/59 |

FOREIGN PATENT DOCUMENTS

| | | | |
|---|---|---|---|
| JP | 2004045656 A | * | 2/2004 |
| JP | 2006227500 A | * | 8/2006 |

(Continued)

*Primary Examiner* — Erika J Villaluna
(74) *Attorney, Agent, or Firm* — Birch, Stewart, Kolasch & Birch, LLP

(57) ABSTRACT

A toner supply roller (1) is produced by preparing a rubber composition which contains a rubber component including an epichlorohydrin rubber and a butadiene rubber, a crosslinking component and a foaming component and, while extruding the rubber composition into a tubular body, continuously foaming and crosslinking the rubber composition of the tubular body by a continuous crosslinking apparatus including a microwave crosslinking device and a hot air crosslinking device. An image forming apparatus incorporates the toner supply roller (1).

6 Claims, 1 Drawing Sheet

(51) Int. Cl.
      *B29L 31/00*        (2006.01)
      *B29C 35/08*        (2006.01)

(56) References Cited

FOREIGN PATENT DOCUMENTS

| | | | | |
|---|---|---|---|---|
| JP | 20060227500 | A | * | 8/2006 |
| JP | 4067893 | B2 | | 3/2008 |
| JP | 2011013563 | A | * | 1/2011 |
| JP | 2011013563 | A | * | 1/2011 |

\* cited by examiner

TONER SUPPLY ROLLER AND IMAGE FORMING APPARATUS

CROSS-REFERENCE TO RELATED APPLICATION

This application corresponds to Japanese Patent Application No. 2014-073641 filed in the Japanese Patent Office on Mar. 31, 2014, the disclosure of which is incorporated herein by reference in its entirety.

TECHNICAL FIELD

The present invention relates to a toner supply roller for supplying toner to a surface of a toner carrier in an electrophotographic image forming apparatus, and an image forming apparatus employing the toner supply roller.

BACKGROUND ART

In an electrophotographic image forming apparatus such as a laser printer, an electrostatic copying machine, a plain paper facsimile machine or a printer-copier-facsimile multifunction machine, an image is generally formed on a surface of a sheet such as a paper sheet or a plastic film through the following process steps.

First, a surface of a photoreceptor body having photoelectric conductivity is evenly electrically charged and, in this state, exposed to light, whereby an electrostatic latent image corresponding to an image to be formed on the sheet is formed on the surface of the photoreceptor body (charging step and exposing step).

Then, toner (minute color particles) preliminarily electrically charged at a predetermined potential is brought into contact with the surface of the photoreceptor body. Thus, the toner selectively adheres to the surface of the photoreceptor body according to the potential pattern of the electrostatic latent image, whereby the electrostatic latent image is developed into a toner image (developing step).

Subsequently, the toner image is transferred onto the surface of the sheet (transfer step), and fixed to the surface of the sheet (fixing step). Thus, the image is formed on the surface of the sheet.

In the developing step out of these process steps, a toner supply roller made of a rubber foam having a predetermined roller resistance is used for supplying the toner to a surface of a toner carrier such as a developing roller for developing the electrostatic latent image formed on the surface of the photoreceptor body into the toner image.

The toner supply roller is required to have the lowest possible hardness so as not to break toner particles held between the toner carrier and the toner supply roller, and to have the most uniform and greatest possible foam cell diameters so as to transport a sufficient amount of the toner to the toner carrier by a single transport operation.

In order to meet the requirements, JP-4067893-B proposes that a rubber component, a crosslinking component for crosslinking the rubber component and a foaming component for foaming the rubber component are blended together to prepare a rubber composition, and the rubber composition is extruded into a tubular body which is in turn foamed and crosslinked in a vulcanization can by pressure and heat, whereby the toner supply roller is produced as having a predetermined expansion ratio and a predetermined cell diameter distribution.

An ion-conductive epichlorohydrin rubber, and at least one rubber selected from the group consisting of an acrylonitrile butadiene rubber (NBR), a chloroprene rubber (CR) and an ethylene propylene diene rubber (EPDM) are used in combination as the rubber component.

SUMMARY OF THE INVENTION

Problem to be Solved by the Invention

According to examination conducted by the inventor of the present invention, the toner supply roller disclosed in JP-4067893-B is still unsatisfactory in expansion ratio and hardness.

That is, the toner supply roller has a smaller expansion ratio and smaller cell diameters, thereby failing to transport a sufficient amount of the toner to the toner carrier by a single transport operation. Further, the toner supply roller has insufficient flexibility particularly in a lower-temperature and lower-humidity environment at a temperature of 10° C. at a relative humidity of 20%, thereby failing to properly follow the surface of the toner carrier. In addition, the toner supply roller becomes harder, so that toner particles held between the toner supply roller and the toner carrier are liable to be broken.

Therefore, imaging failure is liable to occur, i.e., the formed image is liable to suffer from an uneven density and white streaks (streaked image-absent portions) extending in a sheet transportation direction particularly in the lower-temperature and lower-humidity environment.

It is an object of the present invention to provide a toner supply roller which has possibly uniform and great foam cell diameters and a low hardness particularly in the lower-temperature and lower-humidity environment as compared with the prior art and is less liable to suffer from the imaging failure such as the uneven density and the white streaks, and to provide an image forming apparatus employing the toner supply roller.

Solution to Problem

According to an inventive aspect, there is provided a toner supply roller which is produced through the steps of preparing a rubber composition which contains a rubber component including an epichlorohydrin rubber and a butadiene rubber (BR), a crosslinking component for crosslinking the rubber component and a foaming component for foaming the rubber component and, while extruding the rubber composition into a tubular body, continuously foaming and crosslinking the rubber composition of the tubular body by a continuous crosslinking apparatus including a microwave crosslinking device and a hot air crosslinking device.

According to another inventive aspect, there is provided an image forming apparatus incorporating the inventive toner supply roller.

Effects of the Invention

As described above, the prior art toner supply roller disclosed in JP-4067893-B is produced by preparing the rubber composition which contains the rubber component including the epichlorohydrin rubber and at least one rubber selected from the group consisting of the NBR, the CR and the EPDM, extruding the rubber composition into the tubular body, and foaming and crosslinking the rubber component in a batch-type vulcanization can by pressure and heat.

Where the rubber composition containing these rubbers as the rubber component is put in the vulcanization can and foamed under pressure, however, the foaming is suppressed, making it impossible to sufficiently increase the cell diameters. In addition, where an attempt is made to increase the expansion ratio, for example, by increasing the amount of the foaming component, the foam cell diameters are liable to vary.

In JP-4067893-B, therefore, the expansion ratio of the toner supply roller is limited to not greater than 13. With smaller cell diameters, it is impossible to transport a sufficient amount of the toner to the toner carrier by a single transport operation.

With the smaller expansion ratio and the combinational use of the aforementioned rubbers as the rubber component, as described above, the toner supply roller disclosed in JP-4067893-B has insufficient flexibility particularly in the lower-temperature and lower-humidity environment, failing to properly follow the surface of the toner carrier. In addition, the toner supply roller becomes harder, so that the toner particles held between the toner supply roller and the toner carrier are liable to be broken. This may result in the imaging failure such as the uneven density and the white streaks.

Problematically, the toner supply roller disclosed in JP-4067893-B is produced at a lower productivity at higher production costs because of the use of the batch-type vulcanization can.

In the present invention, in contrast, the rubber composition prepared by blending at least the BR with the epichlorohydrin rubber as the rubber component is used. While the rubber composition is extruded into the tubular body, the tubular body is continuously transported through the continuous crosslinking apparatus for the foaming and the crosslinking in the atmospheric environment in which the foaming is not suppressed. Thus, the present invention provides the toner supply roller which has possibly uniform and great foam cell diameters and a low hardness particularly even in the lower-temperature and lower-humidity environment as compared with the prior art and is less liable to suffer from the imaging failure such as the uneven density and the white streaks, and provides the image forming apparatus employing the toner supply roller.

According to the present invention, the toner supply roller can be efficiently produced at a higher productivity at lower costs, as compared with the method using the batch-type vulcanization can, by continuously crosslinking and foaming the rubber composition extruded into the tubular body by means of the continuous crosslinking apparatus.

PREFERRED EMBODIMENTS OF THE INVENTION

Figure 1:
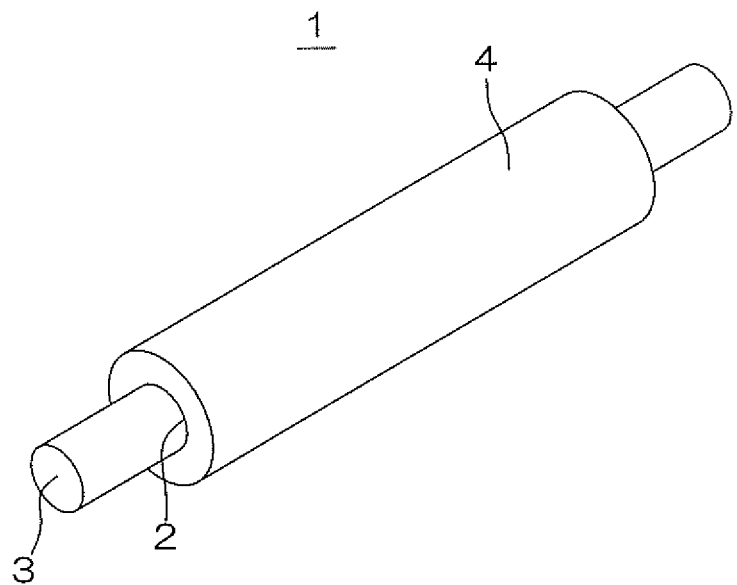
FIG. 1 is a perspective view of an exemplary toner supply roller according to an embodiment of the present invention.

A toner supply roller according to the present invention is produced through the steps of preparing a rubber composition containing a rubber component including an epichlorohydrin rubber and a BR, a crosslinking component for crosslinking the rubber component and a foaming component for foaming the rubber component and, while extruding the rubber composition into a tubular body, continuously foaming and crosslinking the rubber composition of the tubular body by means of a continuous crosslinking apparatus including a microwave crosslinking device and a hot air crosslinking device.

Rubber Composition

<Rubber Component>

As described above, at least the epichlorohydrin rubber and the BR are used in combination as the rubber component. The toner supply roller can be produced as having a greater expansion ratio, uniform cell diameters and a lower hardness even at a lower temperature by the combinational use of the epichlorohydrin rubber and the BR as well as by the foaming and the crosslinking of the rubber composition in the atmospheric environment by means of the continuous crosslinking apparatus. An EPDM and/or an NBR may be additionally blended as the rubber component.

The blending of the EPDM makes it possible to impart the toner supply roller with excellent ozone resistance.

The blending of the NBR makes it possible to finely control the roller resistance of the toner supply roller and to prevent uneven foaming. Further, the NBR functions to enhance the effect of heating the rubber component by absorption of microwaves, thereby assisting the effects of the present invention.

(Epichlorohydrin Rubber)

Examples of the epichlorohydrin rubber include epichlorohydrin homopolymers, epichlorohydrin-ethylene oxide bipolymers (ECO), epichlorohydrin-propylene oxide bipolymers, epichlorohydrin-allyl glycidyl ether bipolymers, epichlorohydrin-ethylene oxide-allyl glycidyl ether terpolymers (GECO), epichlorohydrin-propylene oxide-allyl glycidyl ether terpolymers and epichlorohydrin-ethylene oxide-propylene oxide-allyl glycidyl ether quaterpolymers, which may be used either alone or in combination.

Of the aforementioned examples, the ethylene oxide-containing copolymers, particularly the ECO and/or the GECO are preferred as the epichlorohydrin rubber. These copolymers preferably each have an ethylene oxide content of not less than 30 mol % and not greater than 80 mol %, particularly preferably not less than 50 mol %.

Ethylene oxide functions to reduce the roller resistance of the toner supply roller. If the ethylene oxide content is less than the aforementioned range, however, it will be impossible to sufficiently provide the roller resistance reducing function and hence to sufficiently reduce the roller resistance of the toner supply roller.

If the ethylene oxide content is greater than the aforementioned range, on the other hand, ethylene oxide is liable to be crystallized, whereby the segment motion of molecular chains is hindered to adversely increase the roller resistance of the toner supply roller. Further, the toner supply roller is liable to have a higher hardness after the crosslinking, and the rubber composition is liable to have a higher viscosity when being heat-melted before the crosslinking.

The ECO has an epichlorohydrin content that is a balance obtained by subtracting the ethylene oxide content from the total. That is, the epichlorohydrin content is preferably not less than 20 mol % and not greater than 70 mol %, particularly preferably not greater than 50 mol %.

The GECO preferably has an allyl glycidyl ether content of not less than 0.5 mol % and not greater than 10 mol %, particularly preferably not less than 2 mol % and not greater than 5 mol %.

Allyl glycidyl ether per se functions as side chains of the copolymer to provide a free volume, whereby the crystallization of ethylene oxide is suppressed to reduce the roller resistance of the toner supply roller. However, if the allyl glycidyl ether content is less than the aforementioned range, it will be impossible to provide the roller resistance reducing function and hence to sufficiently reduce the roller resistance of the toner supply roller.

Allyl glycidyl ether also functions as crosslinking sites during the crosslinking of the GECO. Therefore, if the allyl glycidyl ether content is greater than the aforementioned range, the crosslinking density of the GECO is increased, whereby the segment motion of molecular chains is hindered. This may adversely increase the roller resistance of the toner supply roller. Further, the toner supply roller is liable to suffer from reduction in tensile strength, fatigue resistance and flexural resistance.

The GECO has an epichlorohydrin content that is a balance obtained by subtracting the ethylene oxide content and the allyl glycidyl ether content from the total. That is, the epichlorohydrin content is preferably not less than 10 mol % and not greater than 69.5 mol %, particularly preferably not less than 19.5 mol % and not greater than 60 mol %.

Examples of the GECO include copolymers of the three comonomers described above in a narrow sense, as well as known modification products obtained by modifying an epichlorohydrin-ethylene oxide copolymer (ECO) with allyl glycidyl ether. In the present invention, any of these modification products may be used as the GECO.

The proportion of the epichlorohydrin rubber to be blended is preferably not less than 30 parts by mass and not greater than 70 parts by mass based on 100 parts by mass of the overall rubber component. If the proportion of the epichlorohydrin rubber is less than the aforementioned range, it will be impossible to impart the toner supply roller with proper ion conductivity. If the proportion of the epichlorohydrin rubber is greater than the aforementioned range, on the other hand, the proportion of the BR is relatively reduced. Therefore, it will be impossible to provide a toner supply roller having a greater expansion ratio, uniform cell diameters and a lower hardness even at a lower temperature.

Where the EPDM is additionally used, the proportion of the EPDM is relatively reduced, making it impossible to impart the toner supply roller with excellent ozone resistance.

Where the NBR is additionally used, the proportion of the NBR is relatively reduced, making it impossible to sufficiently provide the effect of finely controlling the roller resistance of the toner supply roller and the effect of preventing the uneven foaming.

(BR)

Usable as the BR are various crosslinkable BRs. Particularly, a higher cis-bond percentage BR having a cis-1,4 bond percentage of not less than 95% is preferred, which has excellent lower-temperature characteristic properties and excellent flexibility with a lower hardness in a lower-temperature and lower-humidity environment. The BRs include those of an oil-extension type having flexibility controlled by addition of an extension oil, and those of a non-oil-extension type containing no extension oil. Either type of BRs is usable. These BRs may be used either alone or in combination.

Where the rubber component includes only the two types of rubbers including the epichlorohydrin rubber and the BR, the proportion of the BR to be blended is a balance obtained by subtracting the proportion of the epichlorohydrin rubber from the total. That is, the proportion of the BR is preferably not less than 30 parts by mass and not greater than 70 parts by mass based on 100 parts by mass of the overall rubber component.

If the proportion of the BR is less than the aforementioned range, it will be impossible to sufficiently provide the aforementioned effect by blending the BR with the epichlorohydrin rubber, i.e., it will be impossible to produce the toner supply roller having a greater expansion ratio, uniform cell diameters and a lower hardness even at a lower temperature by blending the BR with the epichlorohydrin rubber as well as by foaming and crosslinking the rubber component in the atmospheric environment by means of the continuous crosslinking apparatus.

If the proportion of the BR is greater than the aforementioned range, the proportion of the epichlorohydrin rubber is relatively reduced, making it impossible to impart the toner supply roller with proper ion conductivity.

Where the EPDM and/or the NBR is further blended as the rubber component, the proportion of the BR is determined by subtracting the proportion of the EPDM and/or the NBR to be described later from the aforementioned range.

If the proportion of the BR is excessively small, however, it will be impossible to sufficiently provide the aforementioned effect by blending the BR, i.e., it will be impossible to produce the toner supply roller having a greater expansion ratio, uniform cell diameters and a lower hardness even at a lower temperature by blending the BR as well as by foaming and crosslinking the rubber component in the atmospheric environment by means of the continuous crosslinking apparatus. Therefore, the proportion of the BR is preferably not less than 20 parts by mass based on 100 parts by mass of the overall rubber component. Where an oil-extension type BR is used, the proportion of the BR is defined as the solid proportion of the BR contained in the oil-extension type BR.

(EPDM)

Usable as the EPDM are various EPDMs each prepared by introducing double bonds into a main chain thereof by employing a small amount of a third ingredient (diene) in addition to ethylene and propylene. A variety of EPDM products containing different types of third ingredients indifferent amounts are commercially available. Typical examples of the third ingredients include ethylidene norbornene (ENB), 1,4-hexadiene (1,4-HD) and dicyclopentadiene (DCP). A Ziegler catalyst is typically used as a polymerization catalyst.

The EPDMs include those of an oil-extension type having flexibility controlled by addition of an extension oil, and those of a non-oil-extension type containing no extension oil. Either type of EPDMs is usable. These EPDMs may be used either alone or in combination.

The proportion of the EPDM to be blended is preferably not less than 5 parts by mass and not greater than 15 parts by mass based on 100 parts by mass of the overall rubber component. If the proportion of the EPDM is less than the aforementioned range, it will be impossible to impart the toner supply roller with excellent ozone resistance. If the proportion of the EPDM is greater than the aforementioned range, on the other hand, the proportion of the epichlorohydrin rubber is relatively reduced, making it impossible to impart the toner supply roller with proper ion conductivity. Further, the proportion of the BR is relatively reduced, making it impossible to produce the toner supply roller having a greater expansion ratio, uniform cell diameters and a lower hardness even at a lower temperature. Where an oil-extension type EPDM is used, the proportion of the EPDM is defined as the solid proportion of the EPDM contained in the oil-extension type EPDM.

(NBR)

The NBR is classified in a lower acrylonitrile content type, an intermediate acrylonitrile content type, an intermediate to higher acrylonitrile content type, a higher acrylonitrile content type or a very high acrylonitrile content type depending on the acrylonitrile content. Any of these types of NBRs is usable.

The NBRs include those of an oil-extension type having flexibility controlled by addition of an extension oil, and those of a non-oil-extension type containing no extension oil. Either type of NBRs is usable. These NBRs may be used either alone or in combination.

The proportion of the NBR to be blended may be properly determined according to the target roller resistance of the toner supply roller. The proportion of the NBR is particularly preferably not less than 10 parts by mass and not greater than 35 parts by mass based on 100 parts by mass of the overall rubber component. If the proportion of the NBR is less than the aforementioned range, it will be impossible to sufficiently provide the effect of finely controlling the roller resistance of the toner supply roller and to enhance the effect of heating the rubber component by absorption of microwaves to thereby assist the effects of the present invention. If the proportion of the NBR is greater than the aforementioned range, on the other hand, the proportion of the epichlorohydrin rubber is relatively reduced, making it impossible to impart the toner supply roller with proper ion conductivity. Further, the proportion of the BR is relatively reduced, making it impossible to produce the toner supply roller having a greater expansion ratio, uniform cell diameters and a lower hardness even at a lower temperature. Where an oil-extension type NBR is used, the proportion of the NBR is defined as the solid proportion of the NBR contained in the oil-extension type NBR.

<Foaming Component>

As the foaming component, a foaming agent which is thermally decomposed to generate gas, and a foaming assisting agent which reduces the decomposition temperature of the foaming agent for promotion of the decomposition are generally used in combination. Particularly, a combination of an azodicarbonamide foaming agent ($H_2NOCN=NCONH_2$, hereinafter sometimes abbreviated as "ADCA") and a foaming assisting agent such as urea is widely used. However, the foaming agent such as ADCA is preferably used alone as the foaming component without the use (blending) of the foaming assisting agent which is liable to reduce the foam cell diameters by reducing the decomposition temperature. This makes it possible to uniformly increase the foam cell diameters of the toner supply roller.

The proportion of the foaming agent to be blended is preferably not less than 1 part by mass and not greater than 5 parts by mass based on 100 parts by mass of the overall rubber component. Where the proportion of the foaming agent is within this range, abnormal local foaming can be suppressed and, therefore, the foam cell diameters are made more uniform.

Examples of the foaming agent include azodicarbonamide ($H_2NOCN=NCONH_2$, ADCA), 4,4'-oxybis(benzenesulfonylhydrazide) (OBSH) and N,N-dinitrosopentamethylene tetramine (DPT), which may be used either alone or in combination.

<Crosslinking Component>

The crosslinking component for crosslinking the rubber component includes a crosslinking agent, an accelerating agent and the like. Examples of the crosslinking agent include a sulfur crosslinking agent, a thiourea crosslinking agent, a triazine derivative crosslinking agent, a peroxide crosslinking agent and various monomers, which may be used either alone or in combination. Among these crosslinking agents, the sulfur crosslinking agent is preferred.

Examples of the sulfur crosslinking agent include sulfur powder and organic sulfur-containing compounds. Examples of the organic sulfur-containing compounds include tetramethylthiuram disulfide and N,N-dithiobismorpholine. Sulfur such as the sulfur powder is particularly preferred.

The proportion of the sulfur to be blended is preferably not less than 0.2 parts by mass and not greater than 5 parts by mass, particularly preferably not less than 1 part by mass and not greater than 3 parts by mass, based on 100 parts by mass of the overall rubber component. If the proportion of the sulfur is less than the aforementioned range, the rubber composition is liable to have a lower crosslinking speed as a whole, requiring a longer period of time for the crosslinking to reduce the productivity of the toner supply roller. If the proportion of the sulfur is greater than the aforementioned range, the toner supply roller is liable to have a higher compression set after the crosslinking, or an excess amount of the sulfur is liable to bloom on an outer peripheral surface of the toner supply roller.

Examples of the accelerating agent include inorganic accelerating agents such as lime, magnesia (MgO) and litharge (PbO), and organic accelerating agents, which may be used either alone or in combination.

Examples of the organic accelerating agents include: guanidine accelerating agents such as di-o-tolylguanidine, 1,3-diphenylguanidine, 1-o-tolylbiguanide and a di-o-tolylguanidine salt of dicatechol borate; thiazole accelerating agents such as 2-mercaptobenzothiazole and di-2-benzothiazyl disulfide; sulfenamide accelerating agents such as N-cyclohexyl-2-benzothiazylsulfenamide; thiuram accelerating agents such as tetramethylthiuram monosulfide, tetramethylthiuram disulfide, tetraethylthiuram disulfide and dipentamethylenethiuram tetrasulfide; and thiourea accelerating agents, which may be used either alone or in combination.

According to the type of the crosslinking agent to be used, at least one optimum accelerating agent is selected from the various accelerating agents for use in combination with the crosslinking agent. For use in combination with the sulfur crosslinking agent, the accelerating agent is preferably selected from the thiuram accelerating agents and the thiazole accelerating agents.

Different types of accelerating agents have different crosslinking accelerating mechanisms and, therefore, are preferably used in combination. The proportions of the accelerating agents to be used in combination may be properly determined, and are preferably not less than 0.1 part by mass and not greater than 5 parts by mass, particularly preferably not less than 0.5 parts by mass and not greater than 2.5 parts by mass, based on 100 parts by mass of the overall rubber component.

The crosslinking component may further include an acceleration assisting agent. Examples of the acceleration assisting agent include: metal compounds such as zinc oxide; fatty acids such as stearic acid, oleic acid and cotton seed fatty acids; and other conventionally known acceleration assisting agents, which may be used either alone or in combination. The proportion of the acceleration assisting agent to be blended may be properly determined according to the types and combination of the rubbers of the rubber component, and the types and combination of the crosslinking agent and the accelerating agent.

<Other Ingredients>

As required, various additives may be added to the rubber composition. Examples of the additives include an acid accepting agent, a plasticizing agent, a processing aid, a degradation preventing agent, a filler, an anti-scorching agent, a UV absorbing agent, a lubricant, a pigment, an anti-static agent, a flame retarder, a neutralizing agent, a nucleating agent, a co-crosslinking agent and the like.

In the presence of the acid accepting agent, chlorine-containing gases generated from the epichlorohydrin rubber during the crosslinking of the rubber component are prevented from remaining in the toner supply roller. Thus, the acid accepting agent functions to prevent the inhibition of the crosslinking and the contamination of the photoreceptor body, which may otherwise be caused by the chlorine-containing gases. Any of various substances serving as acid acceptors may be used as the acid accepting agent. Preferred examples of the acid accepting agent include hydrotalcites and Magsarat which are excellent in dispersibility. Particularly, the hydrotalcites are preferred. Where the hydrotalcites are used in combination with magnesium oxide or potassium oxide, a higher acid accepting effect can be provided, thereby more reliably preventing the contamination of the photoreceptor body.

The proportion of the acid accepting agent to be blended is preferably not less than 0.2 parts by mass and not greater than 5 parts by mass, particularly preferably not less than 0.5 parts by mass and not greater than 2 parts by mass, based on 100 parts by mass of the overall rubber component. If the proportion of the acid accepting agent is less than the aforementioned range, it will be impossible to sufficiently provide the effect of the blending of the acid accepting agent. If the proportion of the acid accepting agent is greater than the aforementioned range, the toner supply roller is liable to have an increased hardness after the crosslinking.

Examples of the plasticizing agent include plasticizers such as dibutyl phthalate (DBP), dioctyl phthalate (DOP) and tricresyl phosphate, and waxes such as polar waxes. Examples of the processing aid include fatty acids such as stearic acid. The proportion of the plasticizing agent and/or the processing aid to be blended is preferably not greater than 5 parts by mass based on 100 parts by mass of the overall rubber component. This prevents the contamination of the photoreceptor body, for example, when the toner supply roller is mounted in an image forming apparatus or when the image forming apparatus is operated. For this purpose, it is particularly preferred to use any of the polar waxes as the plasticizing agent.

Examples of the degradation preventing agent include various anti-aging agents and anti-oxidants. The anti-oxidants serve to reduce the environmental dependence of the roller resistance of the toner supply roller and to suppress the increase in roller resistance during continuous energization of the toner supply roller. Examples of the anti-oxidants include nickel diethyldithiocarbamate (NOCRAC (registered trade name) NEC-P available from Ouchi Shinko Chemical Industrial Co., Ltd.) and nickel dibutyldithiocarbamate (NOCRAC NBC available from Ouchi Shinko Chemical Industrial Co., Ltd.)

Examples of the filler include zinc oxide, silica, carbon, carbon black, clay, talc, calcium carbonate, magnesium carbonate and aluminum hydroxide, which may be used either alone or in combination. The mechanical strength and the like of the toner supply roller can be improved by blending the filler.

Where electrically conductive carbon black is used as the filler, it is possible to improve the microwave absorbing efficiency of the entire rubber composition and to impart the toner supply roller with electron conductivity. A preferred example of the electrically conductive carbon black is HAF. The HAF is particularly excellent in microwave absorbing efficiency, and can be evenly dispersed in the rubber composition to impart the toner supply roller with more uniform electron conductivity. The proportion of the electrically conductive carbon black to be blended is preferably not less than 5 parts by mass and not greater than 25 parts by mass, particularly preferably not greater than 20 parts by mass, based on 100 parts by mass of the overall rubber component.

Examples of the anti-scorching agent include N-cyclohexylthiophthalimide, phthalic anhydride, N-nitrosodiphenylamine and 2,4-diphenyl-4-metyl-1-pentene, which may be used either alone or in combination. Particularly, N-cyclohexylthiophthalimide is preferred. The proportion of the anti-scorching agent to be blended is preferably not less than 0.1 part by mass and not greater than 5 parts by mass, particularly preferably not greater than 1 part by mass, based on 100 parts by mass of the overall rubber component.

The co-crosslinking agent serves to crosslink itself as well as the rubber component to increase the overall molecular weight. Examples of the co-crosslinking agent include ethylenically unsaturated monomers typified by methacrylic esters, metal salts of methacrylic acid and acrylic acid, polyfunctional polymers utilizing functional groups of 1,2-polybutadienes, and dioximes, which may be used either alone or in combination.

Examples of the ethylenically unsaturated monomers include:
(a) monocarboxylic acids such as acrylic acid, methacrylic acid and crotonic acid;
(b) dicarboxylic acids such as maleic acid, fumaric acid and itaconic acid;
(c) esters and anhydrides of the unsaturated carboxylic acids (a) and (b);
(d) metal salts of the monomers (a) to (c);
(e) aliphatic conjugated dienes such as 1,3-butadiene, isoprene and 2-chloro-1,3-butadiene;
(f) aromatic vinyl compounds such as styrene, α-methylstyrene, vinyltoluene, ethylvinylbenzene and divinylbenzene;
(g) vinyl compounds such as triallyl isocyanurate, triallyl cyanurate and vinylpyridine each having a hetero ring; and
(h) cyanovinyl compounds such as (meth)acrylonitrile and α-chloroacrylonitrile, acrolein, formyl sterol, vinyl methyl ketone, vinyl ethyl ketone and vinyl butyl ketone. These ethylenically unsaturated monomers may be used either alone or in combination.

Monocarboxylic acid esters are preferred as the esters (c) of the unsaturated carboxylic acids.

Specific examples of the monocarboxylic acid esters include:
alkyl (meth)acrylates such as methyl (meth)acrylate, ethyl (meth)acrylate, n-propyl (meth)acrylate, i-propyl (meth) acrylate, n-butyl (meth)acrylate, i-butyl (meth)acrylate, n-pentyl (meth)acrylate, i-pentyl (meth)acrylate, n-hexyl (meth) acrylate, cyclohexyl (meth) acrylate, 2-ethylhexyl (meth)acrylate, octyl (meth)acrylate, i-nonyl (meth) acrylate, tert-butylcyclohexyl (meth)acrylate, decyl (meth)acrylate, dodecyl (meth)acrylate, hydroxymethyl (meth)acrylate and hydroxyethyl (meth) acrylate;
aminoalkyl (meth)acrylates such as aminoethyl (meth) acrylate, dimethylaminoethyl (meth)acrylate and butylaminoethyl (meth) acrylate;
(meth)acrylates such as benzyl (meth)acrylate, benzoyl (meth)acrylate and aryl (meth)acrylates each having an aromatic ring;

(meth)acrylates such as glycidyl (meth)acrylate, methaglycidyl (meth)acrylate and epoxycyclohexyl (meth)acrylate each having an epoxy group;

(meth)acrylates such as N-methylol (meth)acrylamide, γ-(meth)acryloxypropyltrimethoxysilane and tetrahydrofurfuryl methacrylate each having a functional group; and polyfunctional (meth)acrylates such as ethylene glycol di(meth)acrylate, trimethylolpropane tri(meth)acrylate, ethylene dimethacrylate (EDMA), polyethylene glycol dimethacrylate and isobutylene ethylene dimethacrylate. These monocarboxylic acid esters may be used either alone or in combination.

The rubber composition containing the ingredients described above can be prepared in a conventional manner. First, the rubbers for the rubber component are blended in the predetermined proportions, and the resulting rubber component is simply kneaded. After additives other than the foaming component and the crosslinking component are added to and kneaded with the rubber component, the foaming component and the crosslinking component are finally added to and further kneaded with the resulting mixture. Thus, the rubber composition is provided. A kneader, a Banbury mixer, an extruder or the like, for example, is usable for the kneading.

<<Toner Supply Roller>>

FIG. 1 is a perspective view illustrating an exemplary toner supply roller according to one embodiment of the present invention. Referring to FIG. 1, the toner supply roller 1 according to this embodiment is a tubular body of a single layer structure formed from the rubber composition described above, and a shaft 3 is inserted through and fixed to a center through-hole 2 of the toner supply roller 1.

The shaft 3 is a unitary member made of a metal such as aluminum, an aluminum alloy or a stainless steel. The shaft 3 is electrically connected to and mechanically fixed to the toner supply roller 1, for example, via an electrically conductive adhesive agent. Alternatively, a shaft having an outer diameter greater than the inner diameter of the through-hole 2 is used as the shaft 3, and press-inserted into the through-hole 2 to be electrically connected to and mechanically fixed to the toner supply roller 1. Thus, the shaft 3 and the toner supply roller 1 are unitarily rotatable.

As described above, the toner supply roller 1 is preferably produced by extruding the rubber composition into an elongated tubular body by means of an extruder, and continuously feeding out the extruded tubular body in the elongated state without cutting the tubular body to continuously transport the tubular body through the continuous crosslinking apparatus including the microwave crosslinking device and the hot air crosslinking device to continuously foam and crosslink the tubular body.

Figure 2:
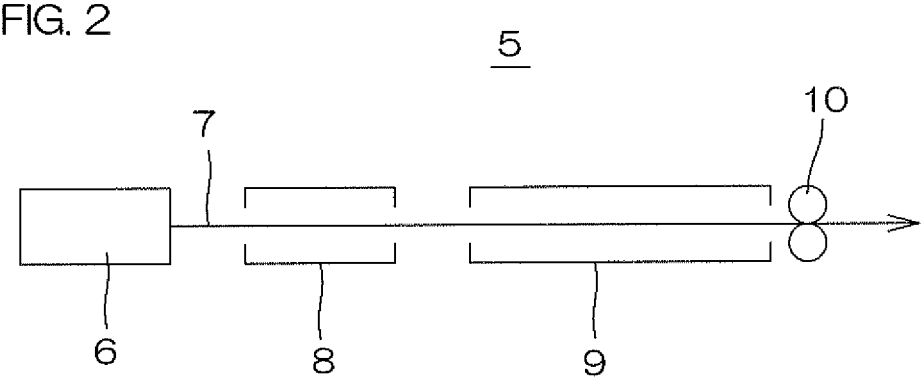
FIG. 2 is a block diagram schematically illustrating a continuous crosslinking apparatus to be used in the production of the inventive toner supply roller.

FIG. 2 is a block diagram for briefly explaining an example of the continuous crosslinking apparatus. Referring to FIGS. 1 and 2, the continuous crosslinking apparatus 5 according to this embodiment includes a microwave crosslinking device 8, a hot air crosslinking device 9 and a take-up device 10 provided in this order on a continuous transportation path along which an elongated tubular body 7 formed by continuously extruding the rubber composition by an extruder 6 for the toner supply roller 1 is continuously transported in the elongated state without cutting by a conveyor (not shown) or the like. The take-up device 10 is adapted to take up the tubular body 7 at a predetermined speed.

First, the ingredients described above are mixed and kneaded together. The resulting rubber composition is formed into a ribbon shape, and continuously fed into the extruder 6 to be continuously extruded into the elongated tubular body 7 by operating the extruder 6. In turn, the extruded tubular body 7 is continuously transported at the predetermined speed by the conveyor and the take-up device 10 to be passed through the microwave crosslinking device 8 of the continuous crosslinking apparatus 5, whereby the rubber composition forming the tubular body 7 is crosslinked to a certain crosslinking degree by irradiation with microwaves. Further, the inside of the microwave crosslinking device 8 is heated to a predetermined temperature, whereby the rubber composition is further crosslinked, and foamed by decomposition of the foaming agent.

Subsequently, the tubular body 7 is further transported to be passed through the hot air crosslinking device 9, whereby hot air is applied to the tubular body 7. Thus, the rubber composition is further foamed by the decomposition of the foaming agent, and cross linked to a predetermined crosslinking degree. Then, the tubular body 7 is cooled. Thus, a foaming and crosslinking step is completed, in which the tubular body 7 is foamed and crosslinked.

The continuous crosslinking apparatus 5 is detailed, for example, in JP-4067893-B described above and the like.

The tubular body 7 formed from the rubber composition as having a crosslinking degree and a foaming degree each controlled at a desired level can be continuously provided by properly setting the transportation speed of the tubular body 7, the microwave irradiation dose of the microwave crosslinking device 8, the setting temperature and the length of the hot air crosslinking device 9, and the like (the microwave crosslinking device 8 and the hot air crosslinking device 9 may be each divided into a plurality of sections, and microwave irradiation doses and setting temperatures at these sections may be changed stepwise).

The tubular body 7 being transported may be twisted so that the microwave irradiation dose and the heating degree can be made more uniform throughout the entire tubular body 7 to make the crosslinking degree and the foaming degree of the tubular body 7 more uniform. The continuous crosslinking with the use of the continuous crosslinking apparatus 5 improves the productivity of the tubular body 7, and further reduces the production costs of the toner supply roller 1.

Thereafter, the tubular body 7 thus foamed and crosslinked is cut to a predetermined length, and heated in an over or the like for secondary crosslinking. Then, the resulting tubular body is cooled, and polished to a predetermined outer diameter. Thus, the inventive toner supply roller 1 is produced. The shaft 3 may be inserted into and fixed to the through-hole 2 at any time between the cutting of the tubular body 7 and the polishing of the tubular body 7.

However, the tubular body is preferably secondarily crosslinked and polished with the shaft 3 inserted in the through-hole 2 thereof after the cutting. This prevents the warpage and the deformation of the toner supply roller 1 which may otherwise occur due to the expansion and the contraction of the tubular body 7 during the secondary crosslinking. Further, the tubular body may be polished while being rotated about the shaft 3. This improves the polishing process efficiency, and suppresses the deflection of the outer peripheral surface 4.

Where the outer diameter of the shaft 3 is greater than the inner diameter of the through-hole 2, as described above, the shaft 3 may be pressed into the through-hole 2. Alternatively, the shaft 3 may be inserted into the through-hole 2 of the tubular body 7 before the secondary crosslinking, and fixed to the tubular body 7 with an electrically conductive thermosetting adhesive agent. In the latter case, the thermosetting adhesive agent is cured by the heating in the oven during the secondary crosslinking of the tubular body 7, whereby the shaft 3 is electrically connected to and mechanically fixed to the toner supply roller 1. In the former case, the electrical connection and the mechanical fixing are achieved upon the insertion of the shaft 3.

<<Image Forming Apparatus>>

An image forming apparatus according to the present invention incorporates the inventive toner supply roller. Examples of the inventive image forming apparatus include various electrophotographic image forming apparatuses such as laser printers, electrostatic copying machines, plain paper facsimile machines and printer-copier-facsimile multifunction machines.

EXAMPLES

Example 1

A rubber component was prepared by blending 50 parts by mass of an GECO (HYDRIN (registered trade name) T3108 available from Zeon Corporation) and 50 parts by mass of a BR (non-oil-extension type, JSR BR01 available from JSR Co., Ltd. and having a cis-1,4 bond percentage of 95%).

A rubber composition was prepared by blending ingredients shown below in Table 1 with 100 parts by mass of the overall rubber component, and kneading the resulting mixture by means of a Banbury mixer.

TABLE 1

| Ingredients | Parts by mass |
| --- | --- |
| Foaming agent | 4.0 |
| Acid accepting agent | 1.0 |
| Crosslinking agent | 1.6 |
| Accelerating agent DM | 1.6 |
| Accelerating agent TS | 2.0 |

The ingredients shown in Table 1 are as follows. The amounts (parts by mass) of the ingredients shown in Table 1 are based on 100 parts by mass of the overall rubber component.
Foaming agent: ADCA (VINYFORAC#3 (trade name) available from Eiwa Chemical Industry Co., Ltd.)
Acid accepting agent: Hydrotalcites (DHT-4A-2 available from Kyowa Chemical Industry Co., Ltd.)
Crosslinking agent: Sulfur powder (available from Tsurumi Chemical Industry Co., Ltd.)
Accelerating agent DM: Di-2-benzothiazyl disulfide (SUNSINE MBTS (trade name) available from Shandong Shanxian Chemical Co., Ltd.)
Accelerating agent TS: Tetramethylthiuram disulfide (SANCELER (registered trade name) TS available from Sanshin Chemical Industry Co., Ltd.)

Production of Toner Supply Roller by Continuous Process. The rubber composition thus prepared was fed into the extruder 6, and extruded into an elongated tubular body having an outer diameter of 10 mm and an inner diameter of 3.0 mm by the extruder. The extruded tubular body 7 was continuously fed out in an elongated state without cutting to be continuously passed through the continuous crosslinking apparatus 5 including the microwave crosslinking device 8 and the hot air crosslinking device 9, whereby the rubber composition of the tubular body was continuously foamed and crosslinked.

The microwave crosslinking device 8 had an output of 6 to 12 kW and an internal control temperature of 150° C. to 250° C. The hot air crosslinking device 9 had an internal control temperature of 150° C. to 250° C. and an effective heating chamber length of 8 m. The foamed tubular body 7 had an outer diameter of about 16 mm. In turn, the tubular body 7 was cut to a predetermined length. The resulting tubular body was fitted around a shaft 3 having an outer diameter of 5 mm and an outer peripheral surface to which an electrically conductive thermosetting adhesive agent was applied, and heated at 160° C. for 60 minutes in an oven, whereby the tubular body 7 was secondarily crosslinked and the thermosetting adhesive agent was cured. Thus, the tubular body 7 was electrically connected to and mechanically fixed to the shaft 3.

Opposite end portions of the tubular body 7 were cut, and the outer peripheral surface 4 of the tubular body 7 was polished by a traverse polishing process utilizing a cylindrical polisher to be thereby finished as having an outer diameter of 13.0 mm (with a tolerance of ±0.1 mm). Thus, a toner supply roller 1 was produced.

Example 2

A rubber composition was prepared in substantially the same manner as in Example 1, except that 10 parts by mass of an EPDM (ESPRENE (registered trade name) 505A available from Sumitomo Chemical Co., Ltd) was further blended as the rubber component and the proportion of the BR was 40 parts by mass. Then, a toner supply roller was produced in substantially the same manner as in Example 1 by using the rubber composition thus prepared.

Example 3

A rubber composition was prepared in substantially the same manner as in Example 2, except that 10 parts by mass of electrically conductive carbon black (HAF SEAST 3 (trade name) available from Tokai Carbon Co., Ltd.) was further blended with 100 parts by mass of the rubber component. Then, a toner supply roller was produced in substantially the same manner as in Example 2 by using the rubber composition thus prepared.

Example 4

A rubber composition was prepared in substantially the same manner as in Example 3, except that 15 parts by mass of an NBR (non-oil-extension and lower-acrylonitrile-content type NBR JSR N250SL available from JSR Co., Ltd. and having an acrylonitrile content of 20%) was further blended as the rubber component and the proportion of the BR was 25 parts by mass. Then, a toner supply roller was produced in substantially the same manner as in Example 3 by using the rubber composition thus prepared.

Conventional Example 1

A rubber component was prepared by blending 50 parts by mass of the GECO and 50 parts by mass of the NBR. Then, a rubber composition was prepared by blending ingredients shown below in Table 2 with 100 parts by mass of the overall rubber component, and kneading the resulting mixture by means of a Banbury mixer.

TABLE 2

| Ingredients | Parts by mass |
| --- | --- |
| Foaming agent | 10.0 |
| Foaming assisting agent | 1.0 |
| Acid accepting agent | 1.0 |
| Crosslinking agent | 1.6 |
| Accelerating agent DM | 1.6 |
| Accelerating agent TS | 2.0 |

A urea foaming assisting agent (CELLPASTE 101 (trade name) available from Eiwa Chemical Industry Co., Ltd.) was used as the foaming assisting agent out of the ingredients shown in Table 2, and the other ingredients were the same as those shown in Table 1. The amounts (parts by mass) of the ingredients shown in Table 2 are based on 100 parts by mass of the overall rubber component.

Production of Toner Supply Roller by Batch Process. The rubber composition thus prepared was fed into the extruder, and extruded into a tubular body having an outer diameter of 10 mm and an inner diameter of 3.0 mm. Then, the tubular body was cut to a predetermined length, and fitted around a temporary crosslinking shaft having an outer diameter of 2.2 mm. Subsequently, the resulting tubular body was pressurized and heated in a vulcanization can at 120° C. for 10 minutes and then at 160° C. for 20 minutes by pressurized steam. Thus, the tubular body was foamed by a gas generated by decomposition of the foaming agent and, at the same time, the rubber component was crosslinked. The foamed tubular body had an outer diameter of 35 mm.

Then, the resulting tubular body was removed from the temporary shaft, then fitted around a shaft having an outer diameter of 5 mm and an outer peripheral surface to which an electrically conductive thermosetting adhesive agent was applied, and heated at 160° C. for 60 minutes in an oven. Thus, the rubber component was secondarily crosslinked, and the thermosetting adhesive agent was cured, whereby the tubular body was electrically connected to and mechanically fixed to the shaft. Thereafter, opposite end portions of the tubular body were cut, and the outer peripheral surface of the tubular body was polished by a traverse polishing process utilizing a cylindrical polisher to be thereby finished as having an outer diameter of 13.0 mm (with a tolerance of ±0.1 mm). Thus, a toner supply roller was produced.

This toner supply roller corresponds to the toner supply roller disclosed in JP-4067893-B.

Comparative Example 1

A toner supply roller was produced in substantially the same manner as in Example 1 by a continuous process with the use of the continuous crosslinking apparatus, except that the rubber composition prepared in Conventional Example 1 was used.

Comparative Example 2

A toner supply roller was produced in substantially the same manner as in Conventional Example 1 by a batch process with the use of a vulcanization can, except that the rubber composition prepared in Example 1 was used.

Evaluation of Image in Lower-Temperature and Lower-Humidity Environment. The toner supply rollers produced in Examples, Comparative Examples and Conventional Example were each mounted in place of an original toner supply roller in a toner cartridge of a laser printer (HL-2240D available from Brother Industries, Ltd.), and then the toner cartridge was mounted in the laser printer. An image was formed sequentially on 1000 A4-size paper sheets (4200MP sheets available from Fuji Xerox Co., Ltd.) at a printing percentage of 1% in a lower-temperature and lower-humidity environment at a temperature of 10° C. at a relative humidity of 20%.

Then, a monochromatic half-tone image was formed on ten sheets, and evaluated against imaging failure on the following criteria:
Good (○): Imaging failure such as uneven image density and white streaks was not observed on any of the ten sheets.
Unacceptable (x): Apparent imaging failure such as uneven image density and white streaks was observed on at least one of the ten sheets.
Results are shown in Tables 3 and 4.

TABLE 3

| Parts by mass | | | | |
| --- | --- | --- | --- | --- |
| | Example 1 | Example 2 | Example 3 | Example 4 |
| GECO | 50 | 50 | 50 | 50 |
| BR | 50 | 40 | 40 | 25 |
| EPDM | — | 10 | 10 | 10 |
| NBR | — | — | — | 15 |
| HAF | — | — | 10 | 10 |
| Foaming agent | 4.0 | 4.0 | 4.0 | 4.0 |
| Foaming assisting agent | — | — | — | — |
| Acid accepting agent | 1.0 | 1.0 | 1.0 | 1.0 |
| Crosslinking agent | 1.6 | 1.6 | 1.6 | 1.6 |
| Accelerating agent DM | 1.6 | 1.6 | 1.6 | 1.6 |
| Accelerating agent TS | 2.0 | 2.0 | 2.0 | 2.0 |
| Production method | Continuous process | Continuous process | Continuous process | Continuous process |
| Image evaluation | ○ | ○ | ○ | ○ |

TABLE 4

| Parts by mass | | | |
| --- | --- | --- | --- |
| | Conventional Example 1 | Comparative Example 1 | Comparative Example 2 |
| GECO | 50 | 50 | 50 |
| BR | — | — | 50 |
| EPDM | — | — | — |
| NBR | 50 | 50 | — |
| HAF | — | — | — |
| Foaming agent | 10.0 | 10.0 | 4.0 |
| Foaming assisting agent | 1.0 | 1.0 | — |
| Acid accepting agent | 1.0 | 1.0 | 1.0 |
| Crosslinking agent | 1.6 | 1.6 | 1.6 |
| Accelerating agent DM | 1.6 | 1.6 | 1.6 |
| Accelerating agent TS | 2.0 | 2.0 | 2.0 |
| Production method | Batch process | Continuous process | Batch process |
| Image evaluation | x | x | x |

The results for Conventional Example 1 in Table 4 indicate that the toner supply roller produced by the batch process by using the rubber composition containing the epichlorohydrin rubber and the NBR as the rubber component as disclosed in JP-4067893-B suffered from the imaging failure particularly in the lower-temperature and lower-humidity environment. The results for Comparative Example 1 indicate that the toner supply roller produced by the continuous process by using the same rubber composition as described above also suffered from the imaging failure in the lower-temperature and lower-humidity environment. Further, it was found that the toner supply roller produced by the batch process by using the rubber composition containing the epichlorohydrin rubber and the BR as the rubber component as in the present invention also suffered from the imaging failure in the lower-temperature and lower-humidity environment.

In contrast, the results for Examples 1 to 4 in Table 3 indicate that the toner supply rollers produced by the continuous process by using the rubber composition containing the epichlorohydrin rubber and the BR as the rubber component were capable of preventing the imaging failure in the lower-temperature and lower-humidity environment.

Further, the results for Examples 1 to 4 indicate that the EPDM and/or the NBR may be blended as the rubber component, and that the electrically conductive carbon black may be blended.

What is claimed is:

1. A method for making a toner supply roller, said method comprising:
    preparing a rubber composition which comprises
        a rubber component including an epichlorohydrin rubber, an ethylene propylene diene rubber, an acrylonitrile butadiene rubber, and butadiene rubber, wherein, based upon 100 parts by mass of the overall rubber component, a proportion of the epichlorohydrin rubber is not less than 30 parts by mass and not greater than 70 parts by mass, a proportion of the ethylene propylene diene rubber is not less than 5 parts by mass and not greater than 15 parts by mass, a proportion of the acrylonitrile butadiene rubber is not less than 10 parts by mass and not greater than 35 parts by mass, and a proportion of the butadiene rubber is not less than 20 parts by mass,
        a crosslinking component for crosslinking the rubber component, and
        a foaming component for foaming the rubber component; and
    extruding the rubber composition into a tubular body while continuously foaming and crosslinking the rubber composition of the tubular body by a continuous crosslinking apparatus selected from the group consisting of microwave crosslinking devices and hot air crosslinking devices.

2. The method for making a toner supply roller of claim 1, wherein the rubber composition further comprises electrically conductive carbon black.

3. A toner supply roller which is produced by the method of claim 2.

4. An image forming apparatus incorporating the toner supply roller according to claim 3.

5. A toner supply roller which is produced by the method of claim 1.

6. An image forming apparatus incorporating the toner supply roller according to claim 5.

* * * * *